United States Patent [19]

Loy

[11] Patent Number: 4,642,452
[45] Date of Patent: Feb. 10, 1987

[54] SEMIACTIVE NIGHT VIEWING SYSTEM
[75] Inventor: Fernand R. Loy, Sceaux, France
[73] Assignee: U.S. Philips Corporation, New York, N.Y.
[21] Appl. No.: 781,367
[22] Filed: Sep. 30, 1985
[30] Foreign Application Priority Data Oct. 5, 1984 [FR] France ................ 84 15309

[51] Int. Cl.⁴ ............................................. H01J 31/50
[52] U.S. Cl. ............................. 250/213 VT; 250/216
[58] Field of Search ............ 250/213 R, 213 VT, 216, 250/227, 207

[56]  References Cited
U.S. PATENT DOCUMENTS 3,305,633  2/1967  Chernoch ........................ 178/6.8
3,509,344  5/1967  Bouwers ........................ 250/83.3
4,071,752  1/1978  Manning ........................ 250/213 VT Primary Examiner—Gene Wan
Attorney, Agent, or Firm—Marc D. Schechter

[57] ABSTRACT

A semiactive night viewing system utilizing light intensification forms an image of a scene on an intensifier tube by using an objective lens. The intensified image is picked up by a television camera and is displayed by a display apparatus. The display is observed through an eyepiece. If an observer wishes to identify a target, he switches over to semiative operation by producing a flash of light having a wavelength outside the visible spectrum, having a very short duration, and having lower power. The flash illuminates the central area of the field. At the same time, an image storage device stores the image signal. Subsequently, the image is read out and displayed.

5 Claims, 2 Drawing Figures

SEMIACTIVE NIGHT VIEWING SYSTEM

BACKGROUND OF THE INVENTION

The invention relates to a semiactive night viewing system using light intensification. For normal passive viewing of a scene, the system comprises a large-aperture imaging-forming device which forms an image of the scene on an intensifier tube. The intensified image is transmitted to a television camera which is connected to a display apparatus via a control unit. By means of the control unit, the system can be switched to an active mode of operation in which a single flash of light, of a wavelength outside the visible spectrum, is emitted to produce a pulsed illumination of the central area of the scene.

Fully passive night viewing systems using light intensification are known, such as for example telescopes or binoculars using intensifier tubes (light weight equipment) or low-light-level television cameras (heavier equipment).

Further, active night viewing systems are known in which a light source illuminates the scene. Some of these systems use permanent illumination during the viewing period and others employ pulsed illumination which is synchronized which a shutter in the intensifier channel (tomofluoroscopy equipment).

Passive systems have the advantage that they cannot be detected, but their range is limited if the light level at night is low. Active systems have a very large range but they can easily be detected by the adversary.

U.S. Pat. No. 3,509,344 describes a device with a night viewing telescope. The device combines a passive system with an active system. The image of the scene which is illuminated by infrared radiation emitted by a light flash is converted into a visible image in the telescope by a converter tube.

SUMMARY OF THE INVENTION

It is an object of the present invention to provide a substantial improvement in the range of a semiactive night viewing device, while assuming that the detectability remains low (for example comparable with that of a laser telemeter).

According to the invention, the light flash has a very short duration and low power. The image of the illuminated scene is stored in an image storage device, is subsequently read out and is displayed by the display apparatus. The mode of operation, after extinction of the flash, becomes passive when the stored image is displayed. The device may be switched from semiactive observation to normal passive observation of the scene by the control unit.

DESCRIPTION OF THE PREFERRED EMBODIMENTS

Figure 1:
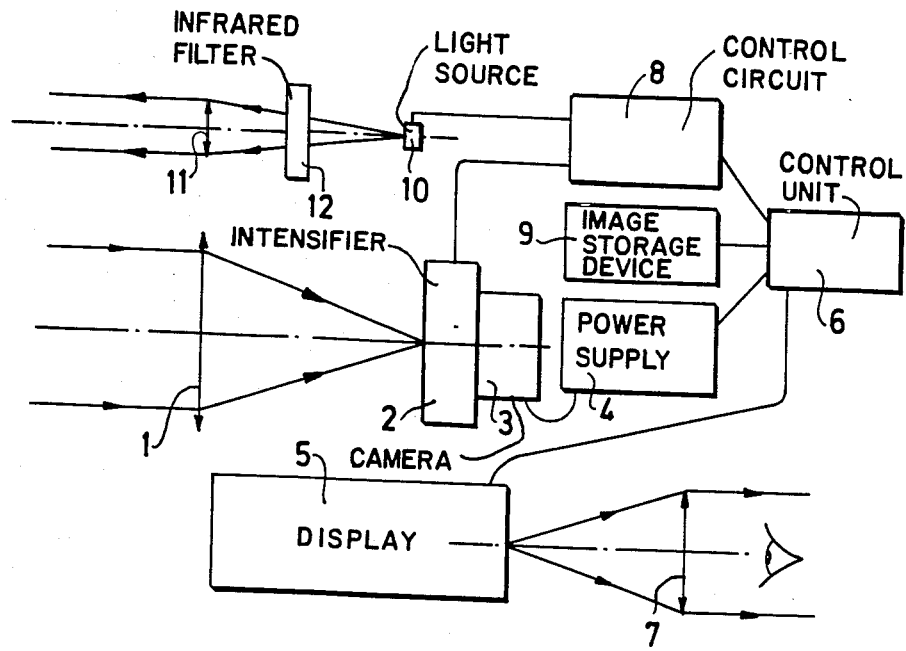
FIG. 1 schematically shows the system according to the invention.

In the diagram of FIG. 1, a large-aperture objective 1 forms an image of a scene on an intensifier tube 2. The objective 1/tube 2 assembly operates in the visible and near-infrared regions. This image is picked up by a television camera 3 having a power supply 4. Camera 3 and power supply 4 are connected to a display apparatus 5 via a control unit 6. The image is viewed through an eyepiece 7.

The part of the apparatus described above is for use in normal, passive operation in which the system is equivalent to a low-light-level television system.

When the observer wishes to identify a target, he presses a button on the control unit 6 to produce, via a control circuit 8, a single light flash from a source 10. The flash has a very short duration and low power, and its field is exactly bounded by a projection lens 11 in such a way that only the center of the field to be observed is illuminated.

This additional illumination improves the signal-to-noise ratio and the contrast of the image. The short duration of the flash ensures that it cannot be detected directly by the eye. Moreover, according to the invention, the image is stored in an image storage device 9, is subsequently read out, and is displayed by the display apparatus 5. The operation of the system is active for the duration of the very short flash, and becomes passive for the rest of the time when the stored image is observed while the button is depressed. For this reason, the viewing system is referred to as a semiactive system.

As soon as the button is released, the stored image is removed, and the device is switched to normal viewing of the scene in the passive mode.

In a first varient of the system, the light source 10 delivering the flash is a diode laser which emits pulses on the order of a microsecond in the near-infrared. The control circuit 8 synchronizes the power supply of the intensifier tube 2 with the emission of the flash 10 and shifts them in time in order to produce a tomofluoroscopy effect in which back scatter from atmospheric mist near the observer is removed.

In a second variant, the flash covers the entire spectrum and is a pulse on the order of ten milliseconds, but not exceeding 20 milliseconds. An infrared filter 12 is arranged between the flash 10 and the projection lens 11. However, a pulse of this duration, which cannot be detected by the eye and which always requires storage of the image according to the invention, is too long to produce a tomofluoroscopy effect. The intensifier tube 2 is then permanently energized, and the actuation of the button on the control 6 only causes the light flash to be emitted.

In a preferred embodiment of the first variant of the system the tube 2 is a second or third generation microchannel tube with double-proximity focussing associated with a CCD detector array. The display apparatus 5 is, for example, a cathode ray tube or liquid crystal micromonitor. The solid state CCD camera 3 has a matrix of $200 \times 300$ pixels. The image storage device 9 has $128 \times 128$ pixels. This arrangement forms a miniature portable television camera with a tomofluoroscopy effect.

Figure 2:
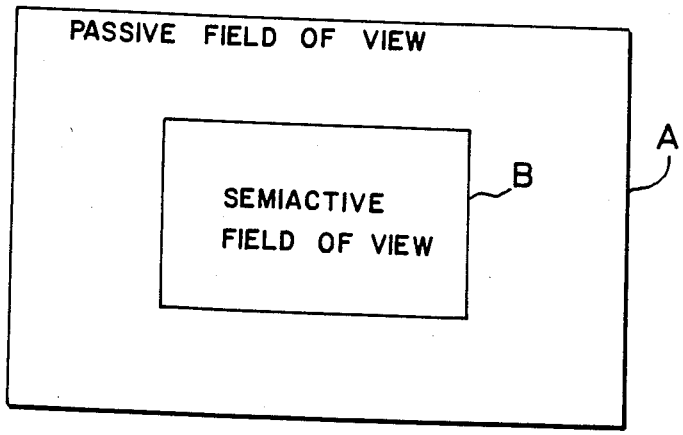
FIG. 2 represents the fields of view of the system during passive operation and during semiactive operation.

In FIG. 2, the field of view of the system during passive operation is represented by the rectangle A. The field of view during semiactive operation is represented by the rectangle B. This latter field of view corresponds to the size of the image storage device 9. The field which is illuminated by the projection lens 11 is slightly larger than the field B.

What is claimed is:

1. A semiactive night viewing system comprising:
   means for receiving an image of a scene and for generating a signal corresponding to the image;

means for receiving the image signal and for displaying an image corresponding to the image signal;
means for illuminating the scene with a flash of light having a wavelength outside the visible spectrum, said flash having a very short duration and low power;
means for storing the image signal corresponding to the illuminated scene and for reading out the stored image signal and displaying it in the display device;
means for preventing further flashes during display of the stored image signal; and
means for removing the display of the stored image signal and for displaying a passive image of the scene.

2. A semiactive night viewing system comprising:
an image intensifier tube for receiving an image and producing an intensified output image;
a large-aperture image-forming device for forming an image of a scene on the image intensifier tube;
a television camera for receiving the intensified image and producing an image signal corresponding to the intensified image;
a display device for displaying an image corresponding to the image signal;
means for illuminating the scene with a flash of light having a wavelength outside the visible spectrum; and
a control unit for activating the flash means;
characterized in that:
the control unit activates the flash means to produce a flash of very short duration and low power;
the system further comprises means for storing the image signal corresponding to the illuminated scene and for reading out the stored image signal and displaying it on the display device;
the control unit prevents further flashes during display of the stored image signal; and
the control unit includes means for removing the display of the stored image signal and for displaying a passive image of the scene.

3. A night viewing system as claimed in claim 2, characterized in that the flash means is a solid state laser diode producing pulses on the order of a microsecond duration.

4. A night viewing system as claimed in claim 3, characterized in that the control unit sequentially activates the flash means and the intensifier so as to produce a tomofluoroscopy effect.

5. A night viewing system as claimed in claim 2, characterized in that:
the control unit continuously activates the intensifier; and
the control unit activates the flash means to produce a flash of a few microseconds duration.

* * * * *